July 29, 1941.
H. R. SPERRY
2,250,818
LAYING NEST
Filed Feb. 5, 1938
2 Sheets-Sheet 1
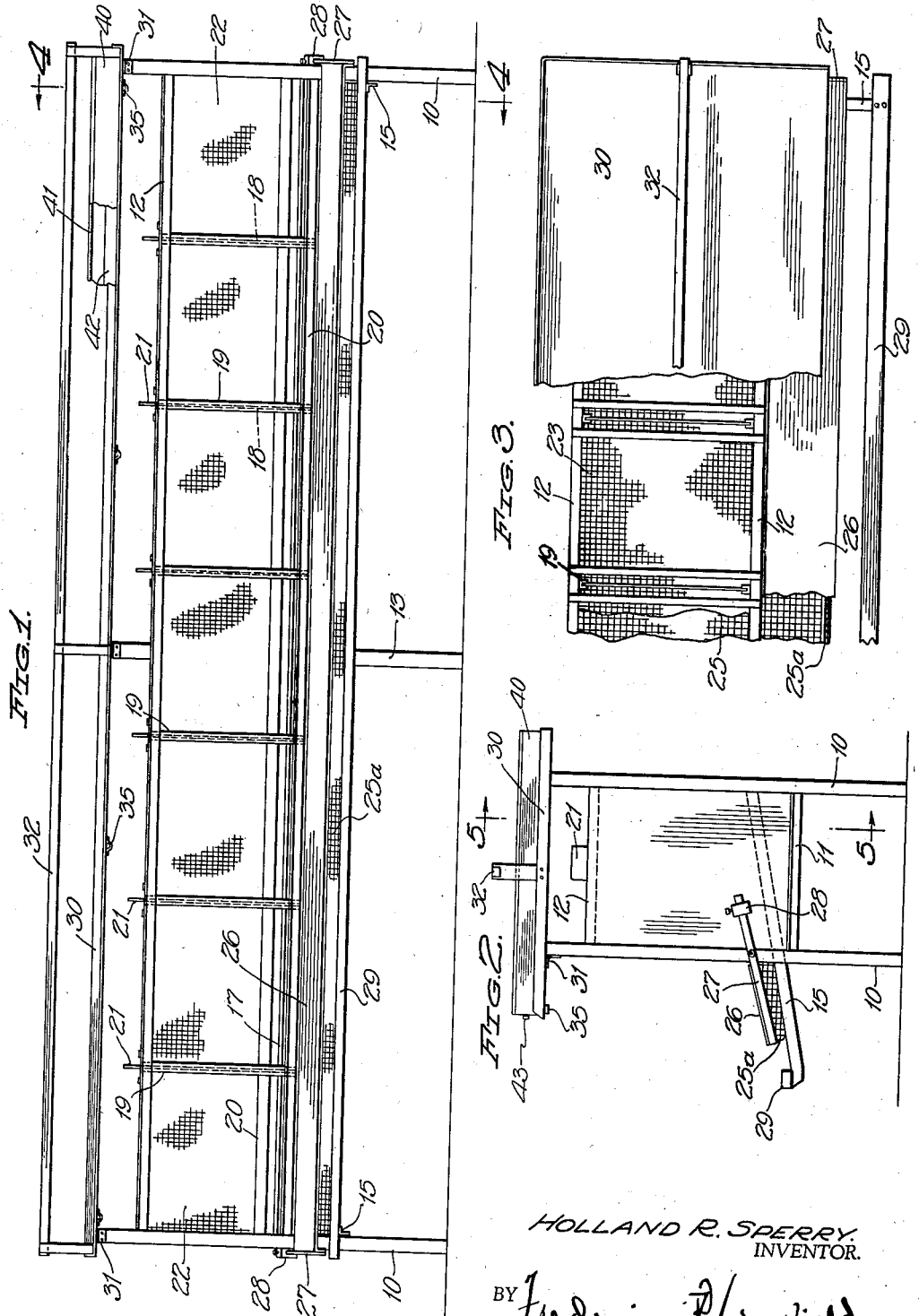
HOLLAND R. SPERRY,
INVENTOR.
BY Frederic P. Worfield
ATTORNEY.

July 29, 1941. H. R. SPERRY 2,250,818
LAYING NEST
Filed Feb. 5, 1938 2 Sheets-Sheet 2
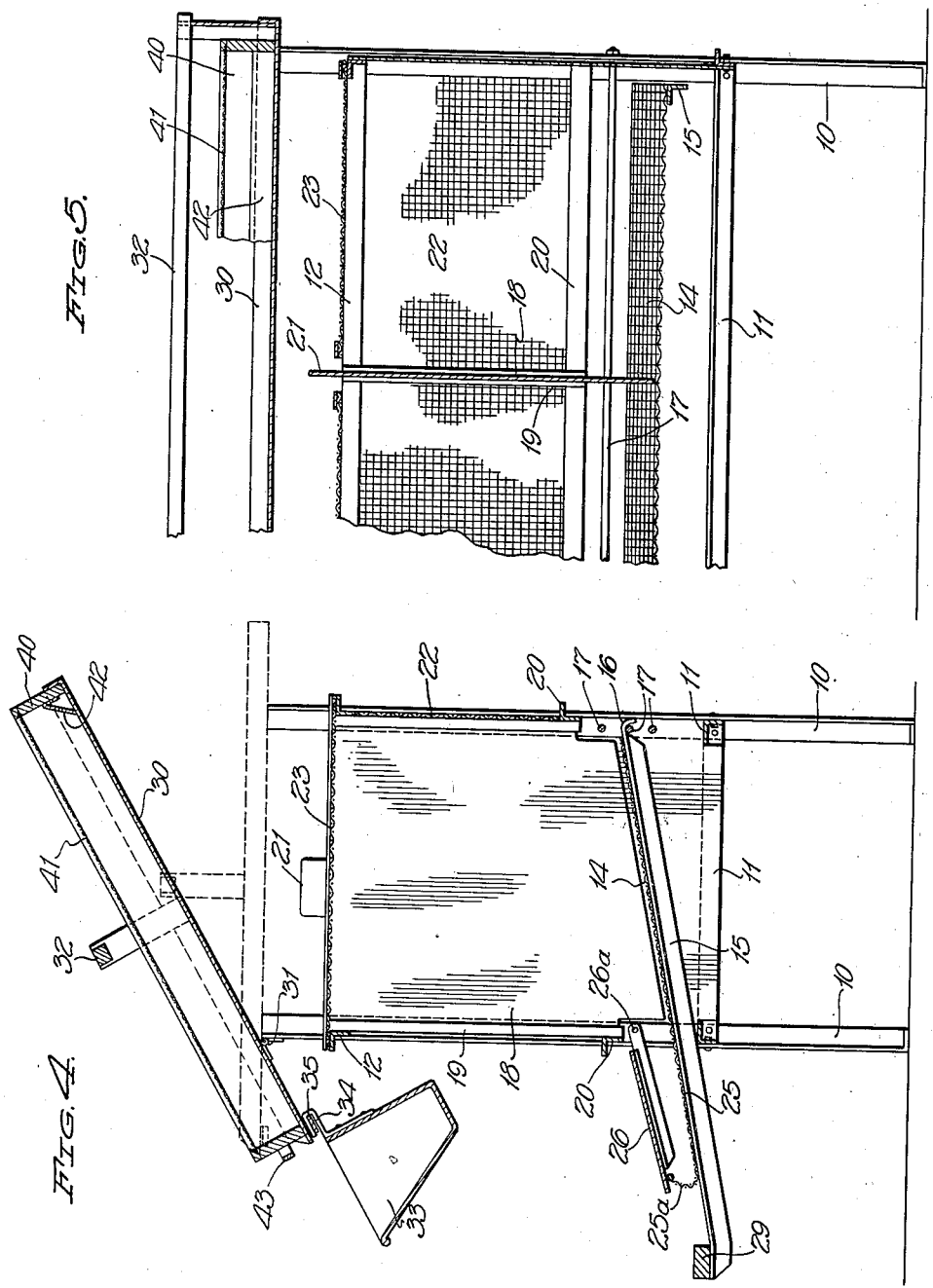
HOLLAND R. SPERRY.
INVENTOR.

Patented July 29, 1941

2,250,818

UNITED STATES PATENT OFFICE 2,250,818

LAYING NEST

Holland R. Sperry, Avon, Conn., assignor to The Pope-Brooks Foundation, Inc., Avon, Conn., a corporation of Connecticut Application February 5, 1938, Serial No. 188,828

5 Claims. (Cl. 119—48)

My present invention relates to improvements in laying nests and more particularly to the provision of a series or battery of such nests mounted on a common supporting frame structure.

An object of the invention is to provide a nest of this type which is thoroughly ventilated and capable of being self-cleaning and readily sprayed for disinfecting purposes.

Another object is to provide a device of this character which will save nesting material and the loss of time incidental to replacing such material.

Another object is to provide a laying nest which will insure against unnecessary soiling from droppings or breakage of the eggs and yet will afford ready visual indication of the presence or absence of eggs to be collected.

This latter feature makes it unnecessary to disturb a laying hen when looking for eggs. Preferably the bottoms of the nests are inclined and the eggs roll out onto a protected shelf from which they may be conveniently removed.

Another object is to provide a nest of knockdown type, preferably consisting entirely of metal parts. The nest unit in knocked-down condition may be compactly stored or shipped and it may be quickly set up at the site of use without any special tools and by unskilled operatives.

Other and more general objects of the invention are to provide a nest of this type which is conveniently portable due to its lightness in weight, yet is of simple, practical, rugged and durable construction and well suited to meet the requirements of economical manufacture.

Preferably the frame work is made of a few light angle iron or channel iron members which may be conveniently bolted together and the nests which rest upon the frame work consist of a plurality of removable metallic sections which may be very readily assembled on the frame and very readily removed for cleaning purposes. The entire construction of the nest tends to inhibit the presence of parasites or vermin and permits ready extermination thereof in the event that they put in an appearance.

The invention may be more fully understood from the following description in connection with the accompanying drawings wherein, Fig. 1 is a front elevational view of a laying nest embodying the invention, Fig. 2 is an end view thereof, Fig. 3 is a fragmentary top plan view with parts broken away for the sake of clearness, Fig. 4 is an enlarged vertical sectional view taken approximately on the line 4—4 of Fig. 1 and illustrating how the dropping board may be conveniently tilted for cleaning purposes, Fig. 5 is an enlarged fragmentary vertical sectional view taken on the line 5—5 of Fig. 2.

The frame forming portion of the nest includes four upright corner pieces such as the angle irons 10 connected near their lower and upper ends by rectangular horizontal frames 11 and 12. These frames may likewise be formed of light gauge angle iron. Any suitable number of additional uprights, such as 13, may be provided to prevent sagging when the nest is of elongated form.

With the form of the invention here illustrated a row of seven individual laying nests are mounted in lateral juxtaposition on the frame work. Obviously this number may be widely varied.

These cages have a common bottom 14 in the nature of a woven wire floor which extends from one end of the frame to the other and is supported at its ends on bars 15. The intermediate portions of these bars rest on the front bar of the frame 11. They have hooked rear ends 16 selectively engageable over any of a series of rods 17 carried by the rear uprights in order to determine the angle at which the nest bottom is inclined.

A series of vertical partitions 18, preferably of sheet metal serve as the side walls of the nests. While various expedients might be resorted to for making these partitions readily removable, I have shown them as slidable into position within vertical channel members 19 which have their ends secured to the upper frame 12 and their lower ends secured to horizontal bars 20 arranged above the nest bottoms. Partitions 18 may be provided with handle extensions 21 to permit them to be lifted conveniently out of their guideways. The nest backs 22 and the nest tops 23 are preferably of wire mesh material and a substantial air space is provided between the top 23 and a dropping board 30, which is described hereafter.

The floor 14 of the nest extends well forwardly of the frame 11, affording a shelf 25 onto which eggs may roll, the front end of this shelf being curved upwardly and rearwardly as at 25ᵃ to trap the eggs. The eggs which find their way onto the shelf are protected by a hinged lid 26, the latter having hinged connections as at 26ᵃ with the forward vertical uprights 10. Preferably at the ends of this lid there are provided rearwardly extending arms 27 carrying counterbalancing weights 28. The counterbalances aid in facilitating lifting the lid of the egg tray and they also serve to hold this lid in upright position while eggs are being removed from the tray.

If desired a perch 29 may be carried by the forward end of the arms 15 and serves not only as a perch approach to the nest but as a handle for pulling out the arms 15 and the common floor of the cages for cleaning purposes. If desired the perch could be mounted on extensions of the end bars of frame 11 and the front part of the floor could rest on the front bar of this frame.

A dropping board 30, preferably of sheet metal and of a width exceeding the depth of the nests is hingedly connected as at 31 to the upper ends of the front uprights 19. This dropping board, in the normal dotted line position shown in Fig. 4, rests upon all of the uprights and it is preferably covered with a layer of peat moss (not shown) to facilitate the removal of droppings therefrom. The dropping board may carry a perch 32 and means is preferably provided for detachably connecting a trough, such as 33, to the front edge of the dropping board so that the dropping board may be tilted to the position shown in full lines in Fig. 4 for removing the droppings and peat moss which are customarily saved for fertilizing purposes.

Any method of effecting the detachable connection with the trough with the front edge of the dropping board may be employed and there are illustratively shown hooks 34 carried by the trough and engaging brackets 35 affixed to the dropping board.

When litter or peat moss is used on the dropping board it is desirable to provide a retaining device for it. In the present instance there is shown a rectangular frame 40 for this purpose. The frame is the proper size to fit the dropping board and stretched across the top of the frame is a coarse wire mesh 41 of heavy gauge wire which prevents contamination of the birds by contact with the droppings.

Secured to the forward face of the rear cross bar of the frame 40 is a scraper shoe 42. When the frame is drawn forwardly by the handle 43 the shoe scrapes the dropping board clean and deposits the material in the trough 33.

It is to be understood that the use of the dropping board and also the use of the frame 40 is entirely optional and that the dropping board might be converted into a shelf for feed and water.

The manner in which a nest of this type may be knocked down for shipment will be more or less apparent from the foregoing description. Merely a few bolts are required to hold the frame work together.

For cleaning purposes the entire nest floor may be readily pulled out and thoroughly washed. The open front, back, and top of the nest make it very easy to spray it thoroughly for disinfecting purposes. The nest structure is not conducive to the breeding of parasites or vermin.

Due to the arrangement of the up-turned egg shelf front 25a casual inspection will reveal the presence or absence of eggs to be removed, and there is never any occasion to disturb the birds in order to hunt for eggs. This type of nest, of course, entirely avoids the danger of undesired incubation and prevents the hens from getting at the eggs to break them. The egg shelf lid keeps the eggs clean.

A unit such as is illustrated here is light enough in weight to be readily portable in fully set up condition. Smaller or larger standardized units may be manufactured in knocked-down condition to conform to special space requirements in chicken houses or to meet the demands of the trade.

It will thus be seen that there is herein described a device in which the several features of this invention are embodied, and which device in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

I claim:

1. Apparatus of the class described including a frame work and a row of laterally juxtaposed laying nests supported on said frame work, said nests having open work floors, backs, and tops and common side walls, the floors being inclined downwardly and forwardly and forwardly extended to afford egg receiving shelves, the shelf and floor-forming portion of all the nests being formed as a single unit and slidably removable for cleaning purposes, bars supporting the ends of said unit and provided at their rearward ends with hooks, and a plurality of members mounted at different levels in the rear of said frame for receiving said hooks and thus providing means for changing the angle of inclination of said floor.

2. Apparatus of the class described including a frame work and a row of laterally juxtaposed laying nests supported on said frame work, said nests having open work floors, backs, and tops and common side walls, the floors being inclined downwardly and forwardly and forwardly extended to afford egg receiving shelves, the shelf and floor-forming portion of all the nests being formed as a single unit and slidably removable for cleaning purposes, and inclined bars supporting the ends of the unit, said bars being pivotally supported at one end in said frame work and means for securing said other ends of said bars at different heights to vary the angle of inclination of said floors and thus to compensate for changes of average weight in said eggs.

3. Apparatus of the class described including a frame work and a row of laterally juxtaposed laying nests supported on said frame work, said nests having open work floors, backs, and tops and common side walls, the floors being inclined downwardly and forwardly and forwardly extended to afford egg receiving shelves, the shelf and floor-forming portion of all the nests being formed as a single unit and slidably removable for cleaning purposes, inclined bars supporting the ends of the unit, said bars being supported at the front on said frame work, and means for securing the rear ends of said bars at different heights to vary the angle of inclination of said floors and thus to compensate for changes of average weight in said eggs.

4. Apparatus of the class described including a frame work and a row of laterally juxtaposed laying nests supported on said frame work, said nests having open work floors, backs, and tops and common side walls, the floors being inclined downwardly and forwardly and forwardly extended to afford egg receiving shelves, the shelf and floor-forming portion of all the nests being formed as a single unit and slidably removable for cleaning purposes, inclined bars supporting the ends of the unit, and a perch carried by the forward ends of the bars paralleling the shelf and serving as a handle for pulling out the floor unit.

5. Apparatus of the class described including a skeleton frame work and a row of laterally juxtaposed laying nests supported on said frame work, said frame work including vertical corner pieces extending above the tops of the nests, a dropping board adapted to rest upon the corner uprights and hinged to certain of said uprights, a slidable cover for said dropping board including wire mesh and a frame therefor, and scraper means mounted in said frame for scraping droppings from said dropping board.

HOLLAND R. SPERRY.